(12) United States Patent
Bhaskaran et al.

(10) Patent No.: US 8,332,961 B2
(45) Date of Patent: Dec. 11, 2012

(54) PLATINUM SILICIDE TIP APICES FOR PROBE-BASED TECHNOLOGIES

(75) Inventors: Harish Bhaskaran, Thalwil (CH); Michel Despont, Au (CH); Ute Drechsler, Rueschlikon (CH); Abu Sebastian, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 12/234,816

(22) Filed: Sep. 22, 2008

(65) Prior Publication Data

US 2010/0077516 A1    Mar. 25, 2010

(51) Int. Cl.
*G01Q 60/40*    (2010.01)
*G01Q 10/00*    (2010.01)

(52) U.S. Cl. .................. 850/41; 850/1; 850/40; 850/29

(58) Field of Classification Search .................... 850/41, 850/1; 365/171, 189.16; 438/52, 703
See application file for complete search history.

(56) References Cited

U.S. PATENT DOCUMENTS

| | | | | |
|---|---|---|---|---|
| 5,126,287 A * | 6/1992 | Jones | | 438/20 |
| 5,221,415 A * | 6/1993 | Albrecht et al. | | 216/2 |
| 5,283,437 A * | 2/1994 | Greschner et al. | | 850/1 |
| 5,371,431 A * | 12/1994 | Jones et al. | | 313/309 |
| 5,374,868 A * | 12/1994 | Tjaden et al. | | 313/310 |
| 5,393,647 A * | 2/1995 | Neukermans et al. | | 430/320 |
| 5,449,903 A * | 9/1995 | Arney et al. | | 850/58 |
| 5,546,375 A * | 8/1996 | Shimada et al. | | 369/126 |
| 5,595,942 A * | 1/1997 | Albrecht et al. | | 438/52 |
| 5,618,760 A * | 4/1997 | Soh et al. | | 438/703 |
| 5,647,785 A * | 7/1997 | Jones et al. | | 445/24 |
| 5,717,132 A * | 2/1998 | Watanabe et al. | | 73/105 |
| 6,139,759 A * | 10/2000 | Doezema et al. | | 216/11 |
| 6,198,300 B1 * | 3/2001 | Doezema et al. | | 324/755.07 |
| 6,227,519 B1 * | 5/2001 | Yagi et al. | | 249/114.1 |
| 6,251,755 B1 * | 6/2001 | Furukawa et al. | | 438/510 |
| 6,366,266 B1 * | 4/2002 | Zhang et al. | | 345/74.1 |
| 6,819,132 B2 * | 11/2004 | Byrd | | 324/754.07 |
| 7,142,449 B2 * | 11/2006 | Smith et al. | | 365/171 |
| RE40,490 E * | 9/2008 | Zhang et al. | | 345/75.2 |
| 7,759,153 B2 * | 7/2010 | Park et al. | | 438/52 |
| 2001/0021575 A1 * | 9/2001 | Furukawa et al. | | 438/563 |
| 2005/0157562 A1 * | 7/2005 | Smith et al. | | 365/189.01 |
| 2006/0002273 A1 * | 1/2006 | Takahashi et al. | | 369/101 |
| 2006/0222869 A1 * | 10/2006 | Cai et al. | | 428/447 |
| 2008/0138924 A1 * | 6/2008 | Park et al. | | 438/52 |

OTHER PUBLICATIONS

Akiyama et al., Development of Insulated Conductive Probes with Platinum Silicide Tips for Atomic Force Microscopy in Cell Biology, Japanese Journal of Applied Physics, vol. 43, No. 6B, 2004. pp. 3865-3867.

Kim et al., Structural phase transitions of Ge2Sb2Te5 cells with TiN electrodes using a homemade W heater tip, Applied Physics Letters, 90, 083103, 2007.

(Continued)

*Primary Examiner* — Nikita Wells
*Assistant Examiner* — Johnnie L Smith
(74) *Attorney, Agent, or Firm* — Ryan, Mason & Lewis, LLP

(57) ABSTRACT

Tips including a platinum silicide at an apex of a single crystal silicon tip are provided herein. Also, techniques for creating a tip are provided. The techniques include depositing an amount of platinum (Pt) on a single crystal silicon tip, annealing the platinum and single crystal silicon tip to form a platinum silicide, and selectively etching the platinum with respect to the formed platinum silicide.

18 Claims, 4 Drawing Sheets

OTHER PUBLICATIONS

Vettiger et al., The "Millipede" Nanotechnology Entering Data Storage, IEEE Transactions on Nanotechnology, vol. 1., No. 1, Mar. 2002.

Kado et al., Nanometer-Scale Erasable Recording Using Atomic Force Microscope on Phase Change Media, Jpn. J. Appl. Phys. vol. 36 (1997) pp. 523-525.

Wright et al., Terabit-Per-Square-Inch Data Storage Using Phase-Change Media and Scanning Electrical Nanoprobes, IEEE Transactions on Nanotechnology, vol. 5, No. 1, Jan. 2006.

Gidon et al., Electrical probe storage using Joule heating in phase change media, Applied Physics Letters, vol. 85, No. 26, Dec. 27, 2004.

Vobecky et al., Reliability of Contacts for Press-Pack High-Power Devices, Microelectronics Reliability 45 (2005) 1676-1681.

Silicide—Wikipedia, http://en.wikipedia.org/wiki/Silicide.

Platinum suicide—Wikipedia, http://en.wikipedia.org/wiki/Platinum_silicide.

Maw et al., Single asperity tribochemical wear of silicon nitride studied by atomic force microscopy, Journal of Applied Physics, vol. 92, No. 9, Nov. 2002.

Cho et al., Terabit inch-2 ferroelectric data storage using scanning nonlinear dielectric microscopy nanodomain engineering system, Nanotechnology 14 (2003) 637-642.

Zhang et al., Dependence of Thermomagnetic Mark Size on Applied STM Voltage in Co—Pt Multilayers, IEEE Transactions of Magnetics, vol. 38, No. 5, Sep. 2002.

Platinum Silicide [PtSi], Stanford Nanofabrication Facility, http://snf.stanford.edu/Materials/ChemFiles/PtSi, html.

* cited by examiner

FIG. 3
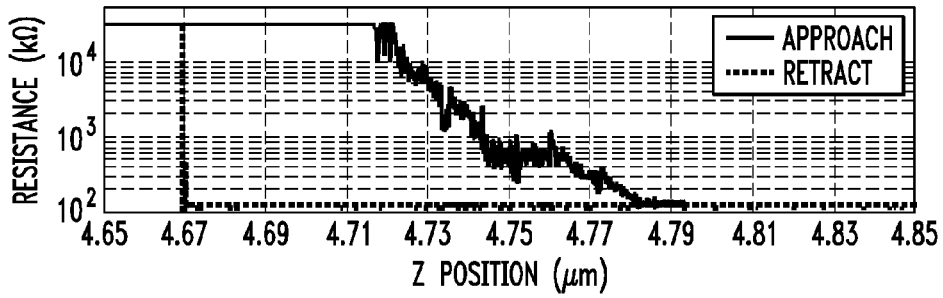
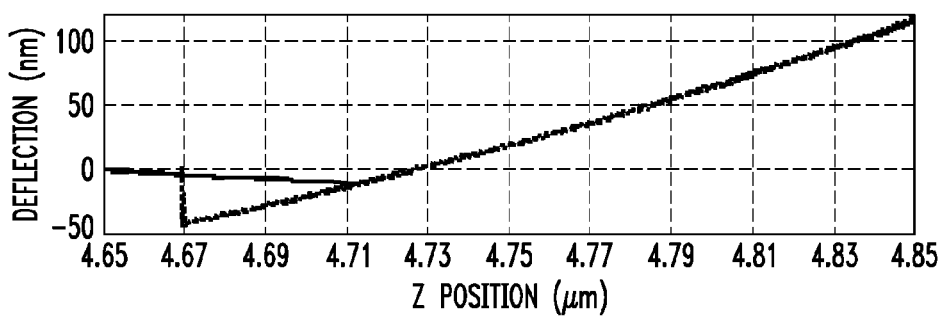
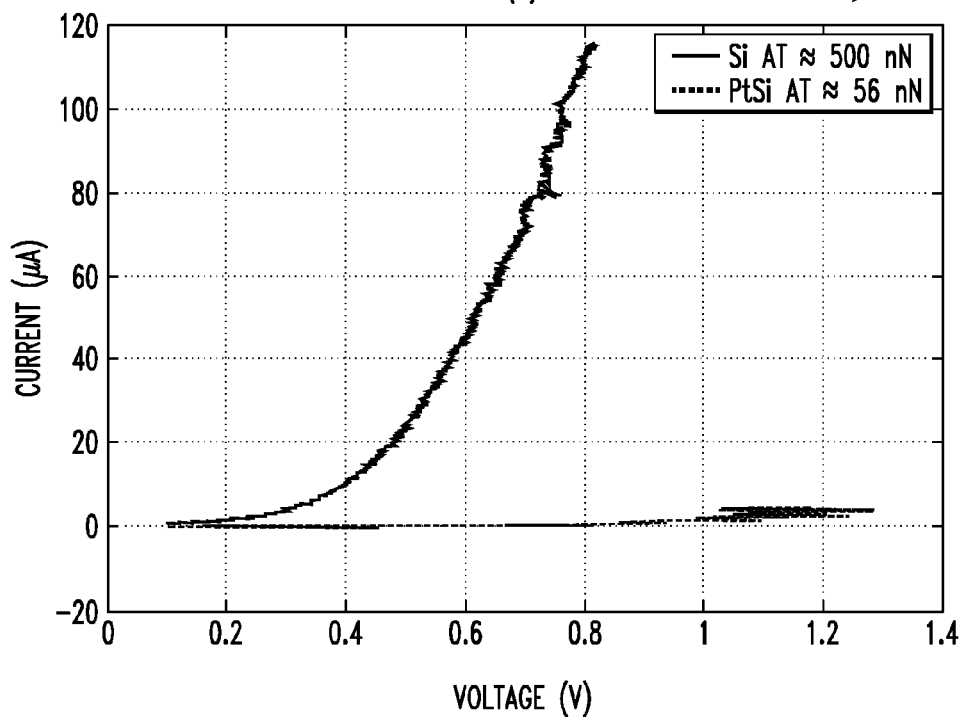

PLATINUM SILICIDE TIP APICES FOR PROBE-BASED TECHNOLOGIES

FIELD OF THE INVENTION

The present invention generally relates to probe-based technologies, and, more particularly, to tip apices.

BACKGROUND OF THE INVENTION

Existing probes for conducting-mode atomic force microscopy (C-AFM) have disadvantages typically associated with wear of the conductive coating. For this reason, monolithic probes of metals are sometimes used, especially for long-term C-AFM experiments. However, this renders the processes difficult to scale, in particular for use on applications such as nanotechnology-based probe storage.

Existing approaches can also include electrical probe storage based on Joule heating in phase-change media, which has potential for high data rates at low cost. The phase-change medium typically used in such storage systems is the $Ge_2Sb_2Te_5$ (from the chalcogenide family, commonly referred to as GST). To write bits, Joule heating of the medium by passing a current through a conducting cantilever with a nanometric tip is typically used. The heating, in turn, changes the phase of the medium from an amorphous to a crystalline state, with a corresponding change in resistivity. To read back a written bit, a simple measurement of this resistance is made, and includes a difference between the resistivities of the two states.

However, as with most c-AFM measurements, the reliability of the nanoscale tip apex conductivity, especially at the tip-sample interface, is a serious concern in commercialization. Existing conducting tips have a conductive coating that is very thin in order to minimize the tip apex radius. This coating can wear off quickly, given the high forces required for reliable conduction. Monolithic cantilevers of metals, such as tungsten and platinum, provide high current densities and fairly reliable performance at forces below the ductile deformation. However, their costs are prohibitive for any large-scale array fabrication as required for probe storage, probe-based manufacturing and other applications that require one or more probes at low cost.

Existing approaches can also include metal silicides of refractory metals such as titanium silicide. However, use of TiSi for conduction by forming TiSi on a silicon wafer results in an oxide forming on the surface (as evidenced by the presence of the breakdown voltage), which impeded conduction.

As such, it would be advantageous to create an electrical probe storage based on conducting cantilevers, as well as to enable reliable conduction using C-AFM tips for materials characterization and manipulation and reliable conduction for applications on probe-based lithography.

SUMMARY OF THE INVENTION

Principles of the present invention provide tips including a platinum silicide at an apex of a single crystal silicon tip.

An exemplary method for creating a tip, according to one aspect of the invention, can include steps of depositing an amount of platinum (Pt) on a single crystal silicon tip, annealing the platinum and single crystal silicon tip to form a platinum silicide, and selectively etching the platinum with respect to the formed platinum silicide.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a diagram illustrating load curve and simultaneous electrical measurement of the tip, according to an embodiment of the present invention.

DETAILED DESCRIPTION OF PREFERRED EMBODIMENTS

Figure 1:
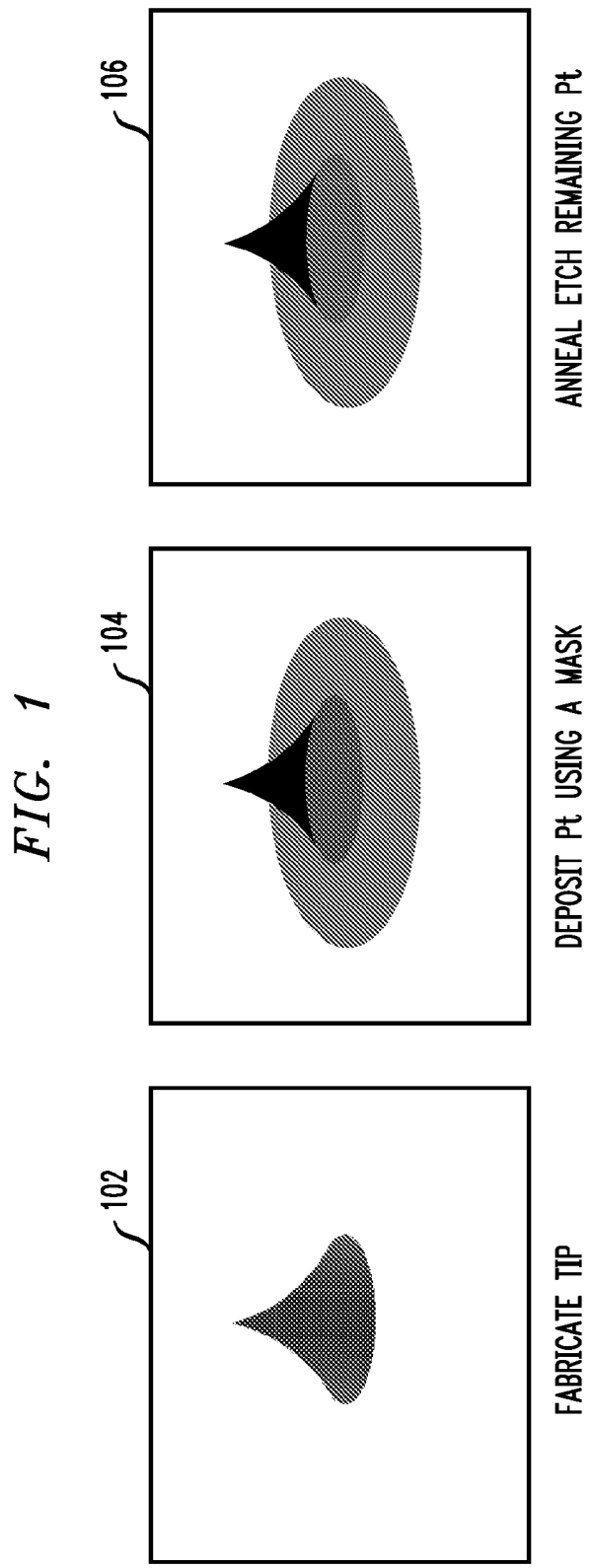
FIG. 1 is a diagram illustrating exemplary platinum silicide formation at tip, according to an embodiment of the present invention.

Principles of the present invention include platinum silicide tip apices for applications of all types of probe-based technologies for superior conduction and/or wear resistance. One or more embodiments of the invention include forming silicides of platinum (for example, PtSi and/or $Pt_2Si$) at the tip apex. Silicides of platinum as tip apex material provide hardness and its known properties in both preventing oxide formation and reducing the Schottky barrier. Additionally, silicides of platinum are an ohmic contact to Si, which is useful for good conduction. Platinum (Pt) is also a noble metal, and therefore reduces probability of oxide at the tip. Further, silicides of platinum can be easily formed only at the tip by a single mask layer, and this process is completely compatible with standard micro-electro-mechanical systems (MEMS) processing. Silicides of platinum can also readily be incorporated into the cantilever fabrication process using a lift-off and annealing step.

One or more embodiments of the invention may also preserve the tip shape and nanoscale dimensions, in contrast to a standard coating in existing approaches which typically results in an increased tip apex diameter. Additionally, the techniques described herein include creating silicides in single-crystal silicon (Si) to exploit its hardness and conduction properties.

As described herein, one or more embodiments of the invention include improving the wear characteristics of silicon tips and/or conduction properties without compromising tip dimensions by using a process to diffuse platinum into silicon to form platinum silicide. Further, the contact resistance of AFM tips significantly improves with the use of platinum silicide (for example, improvement of more than a factor of two). One or more embodiments of the invention also include creating encapsulated tips for even superior wear resistance, a process that is compatible with formation of silicides of platinum at the tip. As such, the formation of silicides of platinum occurs only on silicon and not on the oxide.

In existing approaches, Pt-(or other metals or combinations of metals-) coated tips have severe problems associated with the coating coming off. However, in one or more embodiments of the invention, the formation of silicide is diffusive, hence not a coating. Thus, small amounts of wear will not severely hamper electrical conduction.

As described herein, tip apices with silicides of platinum can be fabricated in conjunction with standard silicon tips. Wear measurements have been carried out on both tip types of similar geometries, and a one-on-one comparison between Si and silicides of platinum at the nanoscale is presented herein. Both the wear properties on tetrahedral amorphous carbon and the conduction on gold (Au) of the silicides of platinum tip apexes are shown to be superior to the Si tips.

An exemplary comparison as described above can be arranged as follows. The force of adhesion can be used as a measure of wear. The sample used can be, for example, tetrahedral amorphous carbon (ta-C) (for wear). For conduction, one can use 200 nm Au on $SiO_2$. Tests can be performed on Si and silicides of platinum-based tips fabricated on the same wafer, with the same spring constant. For a 40 nano-Newton (nN) load, one can use, for example, a 100 millimeter (mm) long cantilever with k=0.26 N/m. For 100 nN load, one can use, for example, a 50 mm long cantilever with k=1 N/m. Tests can be performed in ambient conditions (for example, 22-25° C. and 28-34% relative humidity (RH)).

For consistency of the measurements described herein, both the Si and the silicides of platinum have been fabricated on the same wafer. The Si cantilever can be doped to $10^{19}$ $cm^{-3}$. The silicides of platinum can be formed on the tips by depositing Pt on a single crystal silicon tip using a lift-off process, and then annealing the entire structure. Additionally, the remainder of the Pt can be selectively etched (for example, in $3HCl:1HNO_3$). Such a process can be independently verified to ascertain that Pt residues, if any, are negligible after the etch. This is schematically shown in FIG. 1.

FIG. 1 is a diagram illustrating exemplary platinum silicide formation at tip, according to an embodiment of the present invention. By way of illustration, FIG. 1 depicts step 102, which includes fabricating a tip. Also, step 104 includes depositing Pt on a single crystal silicon tip (for example, using a mask), and step 106 includes annealing the entire structure, and etching the remaining Pt (for example, selectively etching with respect to the formed platinum silicide).

Because all cantilevers are fabricated on the same wafer, the Si tips without Pt underwent the same annealing and subsequent etch processes (barring Pt deposition for the fabrication of the tips with silicides of platinum), thus ruling out effects of other processes on the measurements described herein.

For the measurements, one can use cantilevers with similar spring constants. As noted herein, the tip shape and cone angle for the silicides of platinum and Si tips were individually verified using electron microscopy to be similar, prior to any measurement. For the wear measurements, tips exhibiting similar geometrical characteristics were chosen. The tips used for the noted exemplary comparisons had an apex radius of less than 15 nm. Tetrahedral amorphous carbon (ta-C), for example, can be used as a sample for the wear measurements, as this material serves as a model material for the amorphous carbon capping layer used in electrical phase-change probe storage. One can compare the wear performance of both tips on tetrahedral amorphous carbon at high forces (for example, greater than 40 nN) and illustrate that tips with silicides of platinum have a superior wear resistance. For conduction measurements, 200 nm of e-beam-evaporated Au on $SiO_2$ can be used.

The sample can be mounted on a piezo-actuated flexure stage with XYZ motion capability, and the deflection signal from the cantilever can be measured using an optical detection system that includes a photodiode. To wear the tips, they are brought into contact with the sample surface, and the scanner is moved in the X-scan direction while stepping in the Y-scan direction. The linear velocity while scanning in the X-scan direction can be, for example, 0.25 millimeters per second (mm/s). A feedback controller can maintain a constant cantilever deflection by moving the scanner in the Z-scan direction. As such, for a given spring constant of the cantilever, the force on the tip due to the cantilever stiffness is kept constant. Note that the actual force on the tip can be the sum of the applied force and the force of adhesion.

As described herein, exemplary wear experiments on the tips were performed at two different loading forces of 40 and 113 nN with cantilevers having spring constants 0.26 and 1.13 N/m, respectively. Both cantilevers in a pair had similar tip geometries, and one can use the force of adhesion as a measure of wear. This force can be assumed to be proportional to the surface area in contact with the sample. As such, as the tip wears, the area in contact increases (as the tips are near-conical), resulting in a corresponding increase in adhesion.

To measure the adhesion force, approach curves can be obtained at regular intervals during such an exemplary wear experiment. The scanner can be moved in the Z-scan direction towards the cantilever and then away. The resulting cantilever deflection signal can be recorded. During scanner retraction, the cantilever snaps off at a certain deflection, and the force of adhesion is obtained from this deflection value and the spring constant of the cantilever and is estimated to be their product.

As described herein, experiments were done on two Si and two tips with silicides of platinum. The normal force acting on the cantilever tip was fixed by regulating on a certain set-point deflection signal. The deflection can then be regulated by a feed-back loop, and the force is maintained on the tip during sliding. Adhesion curves can be recorded at regular scan intervals, and plotted in terms of adhesive force as a function of sliding distance. As such, the adhesive force is simply the product of the value of deflection at snap-off and the cantilever spring constant.

Figure 2:
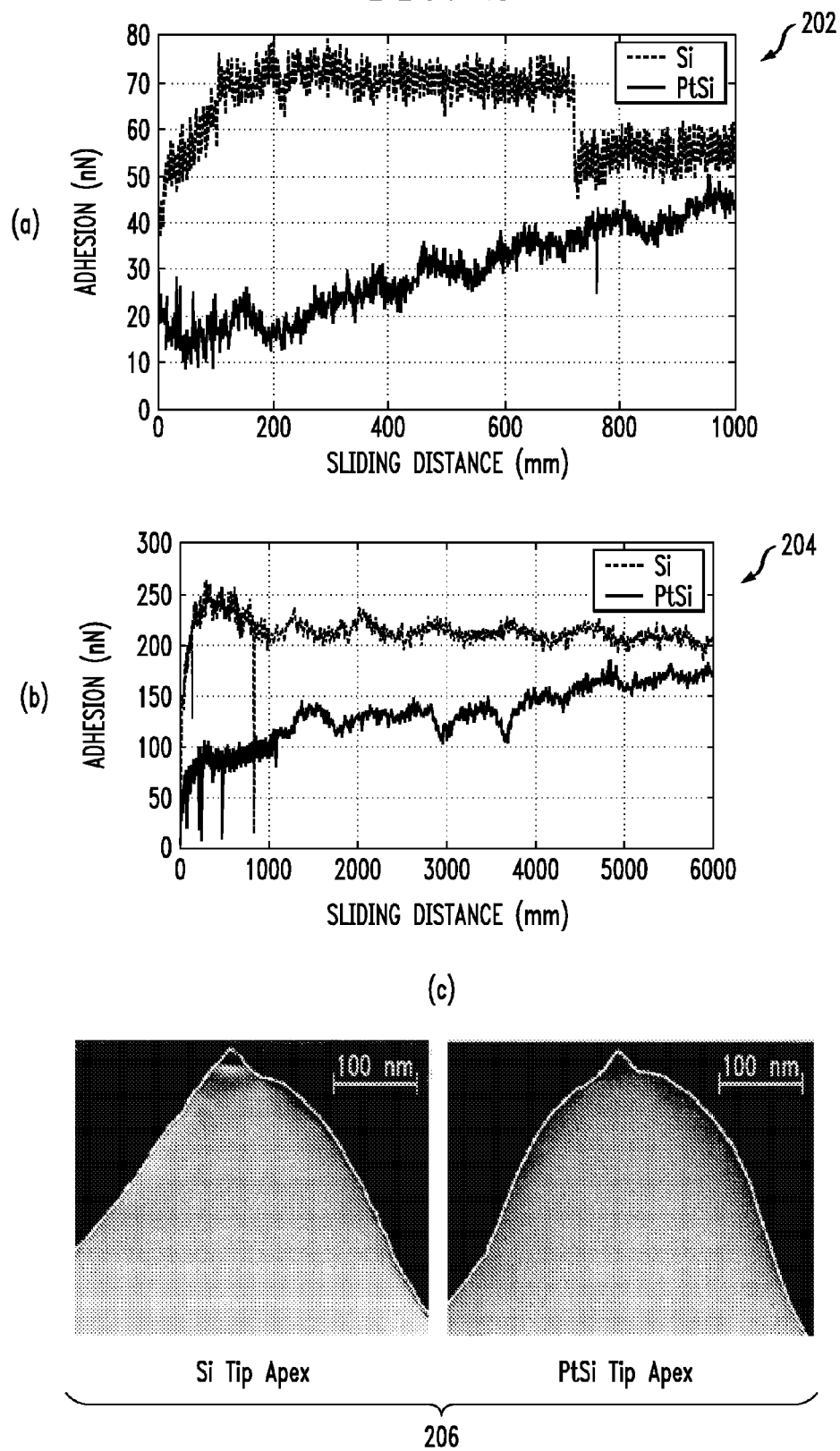
FIG. 2 is a diagram illustrating adhesion as a function of sliding distance of silicon and platinum silicide at different loads, according to an embodiment of the present invention.

The value of the force of adhesion can be plotted as a function of sliding distance, as illustrated in FIG. 2. FIG. 2 is a diagram illustrating adhesion as a function of sliding distance of silicon and platinum silicide at different loads, according to an embodiment of the present invention. By way of example, graph 202 depicts results of a wear experiment carried out with a normal force of 40 nN on Si and tips with silicides of platinum, and graph 204 depicts a comparison of wear-test data at a normal loading force of 113 nN. Also, image 206 depicts a comparison of worn tips of Si (left) and silicides of platinum (right) from the experiment in (b) (magnification: 400,000×). The superimposed lines indicate the tip outline prior to the wear experiment.

As illustrated in FIG. 2, the adhesion of the tip with silicides of platinum increases less rapidly than that of the Si tips. For the first set of data (graph 202), a Si tip and a tip with silicides of platinum (k=0.26 N/m) are worn on ta-C while maintaining a deflection of 150 nm, corresponding to an applied force of 40 nN at the tip. The total sliding distance is 1 meter (m). Adhesion curves are recorded after every 800 μm of sliding. The wear of the silicides of platinum is found to be slower than that of the Si tips, as evidenced by the slower increase in adhesive force. The sudden drop in adhesion for the Si tip is attributed to a sudden change in the contact area due to a part of the tip breaking off and resulting in a new smaller surface area coming into contact.

In graph 204, results of a second wear experiment for a longer sliding distance are shown. This wear experiment was performed while maintaining a deflection of 100 nm using cantilevers with k=1.13 N/m, corresponding to an applied force of 113 nN at the tip. Note that the real force on the tip is the sum of the applied force and the force due to adhesion. In the exemplary experiments detailed herein, one can maintain a constant applied force by controlling the measured deflection, but not correct for the force due to adhesion as the wear progresses. The tips were worn on ta-C for a sliding distance of 6 m. Once again, it is observed that the silicides of platinum wear more slowly than the Si tip does. In fact, the trend observed is very similar to that at lower force in graph 202, where Si quickly wears to a stable diameter at which the increase in adhesion is small (as the diameter is larger and subsequently the vertical rate of wear smaller). However, the silicides of platinum follow a much lower wear curve than the Si tips do.

In image 206, the outline (in white) of the electron micrographs of the unworn tips is overlaid on the worn tips for both Si tips and tips with silicides of platinum, confirming that the Si has indeed worn much more than silicides of platinum. The rate of wear in silicon in ambient conditions is known to be high owing to the formation of $SiO_2$, which reacts with the humidity in the air, resulting in tribochemical etching. The platinum in the silicide, in contrast, inhibits the formation of oxides. In addition, the higher hardness value of silicides of platinum is a favorable factor for wear resistance. Moreover, the formation of the silicide by annealing introduces defects in the Si crystal structure, which can act as barrier in stopping cracks from propagating through the material, unlike crack propagation in crystalline Si.

To measure the conduction of the tips, one can use, as noted herein, 200 nm of Au on $SiO_2$. This sample can be mounted on the piezo-actuated flexure stage, and cantilevers with a spring constant of approx. 1 N/m can be used. The cantilever is held at ground potential, and the sample is voltage-biased. Also, a safety resistor can be used in series to prevent large currents from damaging the tip. Simultaneous measurements of the voltage drop across the tip-sample contact, the current, and the deflection signal can also be obtained.

FIG. 3 is a diagram illustrating load curve and simultaneous electrical measurement of the tip, according to an embodiment of the present invention. The measurements of conduction during a force curve measurement are depicted in FIG. 3. It is noted that especially during the retract operation, the tip conducts until snap off. These measurements were carried out on Au samples. Also, graph 302 and graph 304 depicts a plot of an approach curve of a tip with silicides of platinum to the surface of Au (graph 304) and the simultaneous resistance measurement (graph 302). Graph 306 depicts a comparison of the I—V characteristics of a tip with silicides of platinum and a Si tip of similar tip radius.

As illustrated in graph 302 and graph 304, tips with silicides of platinum start conducting at or immediately after contact, where deflection (graph 304) and resistance (graph 302) at a bias voltage of 2 V with a 10 kΩ series resistor is shown. In contrast, for Si, large forces and higher voltages are required to establish current flow. It is also observed that current flow improves after a few seconds of continuous voltage biasing, but deteriorates if the tip is held without conduction for a few minutes. All of this is consistent with the formation of a native oxide at the silicon surface.

Also, in one or more embodiments, tips with silicides of platinum have a significantly lower resistance than the Si tips, even when the latter are conducting. A plot of the I—V characteristics of silicides of platinum-based and Si tips is shown in graph 306. At relatively lower loads (50 nm of deflection corresponding to roughly 56 nN of applied force) the tip with silicides of platinum resistance to Au is ~4 kΩ, whereas Si tips exhibit a contact resistance to Au greater than 100 kΩ at normal loads in excess of 500 nN. Additionally, one can pass as much as 800 µA through the tip without damaging it, which is advantageous for a tip having an apex radius below 20 nm.

As described herein, one or more embodiments of the invention include comparing fabricated silicon and platinum silicide tips on the same wafer, and measuring the wear and conductance of these tips. It is shown that silicides of platinum have superior wear characteristics and much better contact resistance. Wear of silicides of platinum is slower, even at a very high loading force of 113 nN. These superior characteristics can be due, for example, to the prevention of tribochemical etching, the hardness of the platinum silicide, and the fact that the silicidation process introduces crystalline defects that stop crack propagation.

Moreover, the silicide prevents the native oxide of silicon from forming spontaneously at the surface, thus greatly enhancing the conduction properties and contact reliability. As such, in one or more embodiments of the invention, creating platinum silicide can significantly enhance the performance metrics of conducting probes. This can, for example, enable inexpensive fabrication of reliable, large-scale arrays for applications using electrical probes, as well as have broad implications in the development of many MEMS devices, in which wear and/or contact quality are an issue and the fabrication of devices using other materials is not cost-effective.

As noted herein, one of the major requirements for transitioning probe-based data storage or nanomanufacturing to a commercially viable technology is minimal tip wear. As such, one or more embodiments of the invention include using platinum silicide tips towards wear resistance. By way of example, the apex of tips used in probe-storage can be of nanometric dimensions, typically less than 10 nm. The wear of these tips should preferably be low enough to withstand the expected sliding distance over the lifetime of the device without adversely affecting the write and/or read capability of the probes. While existing approaches have focused on either coating the tip with wear resistant material (thus changing the geometry), or by etching a tip from a different material, one or more embodiments of the invention include wear resistant tips via silicidation of platinum.

Platinum, being a noble metal, is chemically inert in ambient atmosphere, and platinum silicide does not form a stable oxide in air. Further, platinum silicide is a conducting material forming an ohmic contact to silicon, and thus it is suitable for conducting-mode probe storage. Also, for a given voltage, the current is almost 100 times higher for the tips with silicides of platinum.

Additionally, one or more embodiments of the invention include tip geometry that is largely unaffected, as compared to the tips of bulk silicon. This is in contrast to coating methods, which commonly result in increased tip diameter. Further, given the ease with which platinum silicide can be fabricated, for example, using presently available microfabrication facilities, the techniques described herein can enable the commercialization of probe-based technologies.

One or more embodiments of the invention include a tip (for applications of all types of probe-based technologies), wherein the tip includes a platinum silicide at an apex of a single crystal silicon tip. The tip can, for example, preserve tip shape and one or more nanoscale dimensions. Additionally, the tip can be used for conducting-mode atomic force microscopy (C-AFM), nanomanufacturing, nanometrology, data storage, and/or nanolithography.

The silicides of platinum (for example, PtSi and/or $Pt_2Si$) described herein can be used, by way of example and not limitation, in situations where reliable contact and/or wear resistance is an issue such as, for example, MEMS-based switches (for example, radio frequency (RF) switches), and/or in devices that have two surfaces sliding against each other.

Silicides of platinum can also be advantageously formed in standard silicon-based processing, thereby providing an inexpensive alternative to diamond and other hard materials.

Figure 4:
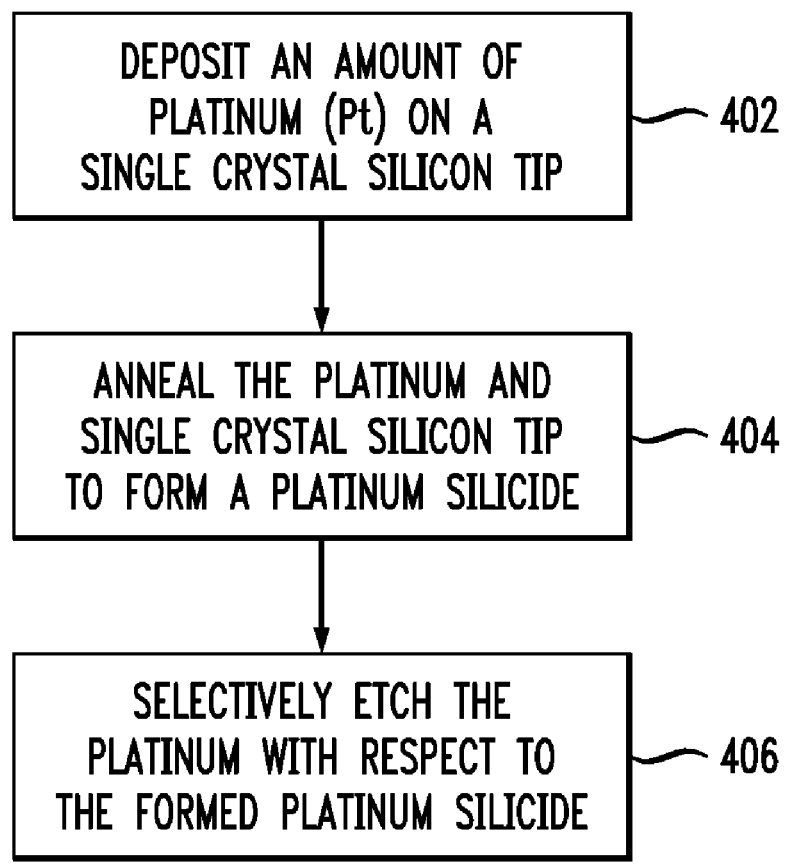
FIG. 4 is a flow diagram illustrating techniques for creating a tip, according to an embodiment of the present invention.

FIG. 4 is a flow diagram illustrating techniques for creating a tip, according to an embodiment of the present invention. Step 402 includes depositing an amount of platinum (Pt) (for example, 10-30 nm of Pt) on a single crystal silicon tip. Depositing an amount of Pt on a single crystal silicon tip can include, for example, using a lift-off process and/or using a single mask layer.

Step 404 includes annealing the platinum and single crystal silicon tip to form a platinum silicide. Annealing the platinum and single crystal silicon tip to form a platinum silicide can include, by way of example, annealing at a range of 300-800° C. (Celsius). Step 406 includes selectively etching the platinum with respect to the formed platinum silicide. Selectively etching the platinum with respect to the formed platinum silicide can include selectively etching the platinum with a metal etchant (for example, $3HCl:1HNO_3$).

The techniques depicted in FIG. 4 can also include incorporating the tip into a cantilever fabrication process using a lift-off and annealing step. Additionally, one or more embodiments of the invention can include creating one or more silicides on single-crystal silicon (Si) (for example, to exploit its hardness and conduction properties). Further, the techniques described herein can include creating an encapsulated tip (for example, for even superior wear resistance).

In one or more embodiments of the present invention, a platinum silicide prevents a native oxide of silicon from forming at a surface of the tip, and the apex of the tip is of nanometric dimensions (for example, less than 10 nm). Also, in one or more embodiments of the invention, the wear of the tip is low enough to withstand the expected sliding distance over a lifetime of a device without adversely affecting at least one of a write capability and a read capability of one or more probes.

At least one embodiment of the invention may provide one or more beneficial effects, such as, for example, improving both the wear characteristics of silicon tips as well as conduction properties without compromising tip dimensions by using a process to diffuse platinum into silicon to form platinum silicide.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A tip, wherein the tip comprises a platinum silicide at an apex of a single crystal silicon tip.

2. The tip of claim 1, wherein the tip is used for conducting-mode atomic force microscopy (C-AFM).

3. The tip of claim 1, wherein the tip is used for nanomanufacturing.

4. The tip of claim 1, wherein the tip is used for nanometrology.

5. The tip of claim 1, wherein the tip is used for data storage.

6. The tip of claim 1, wherein the tip is used for nanolithography.

7. The tip of claim 1, wherein the tip preserves tip shape and one or more nanoscale dimensions.

8. A method for creating a tip, comprising the steps of:
depositing an amount of platinum (Pt) on a single crystal silicon tip;
annealing the platinum and single crystal silicon tip to form a platinum silicide; and
selectively etching the platinum with respect to the formed platinum silicide.

9. The method of claim 8, wherein depositing an amount of Pt on a single crystal silicon tip comprises using a lift-off process.

10. The method of claim 8, wherein depositing an amount of Pt on a single crystal silicon tip comprises using a single mask layer.

11. The method of claim 8, wherein annealing the platinum and single crystal silicon tip to form a platinum silicide comprises annealing at a range of 300-800° C.

12. The method of claim 8, wherein selectively etching the platinum with respect to the formed platinum silicide comprises selectively etching the platinum with a metal etchant.

13. The method of claim 8, further comprising incorporating the tip into a cantilever fabrication process using a lift-off and annealing step.

14. The method of claim 8, further comprising creating an encapsulated tip.

15. The method of claim 8, wherein the platinum silicide prevents a native oxide of silicon from forming at a surface of the tip.

16. The method of claim 8, wherein an apex of the tip is of nanometric dimensions.

17. The method of claim 8, wherein wear of the tip is low enough to withstand the expected sliding distance over a lifetime of a device without adversely affecting at least one of a write capability and a read capability of one or more probes.

18. The method of claim 8, wherein the tip is used for at least one of conducting-mode atomic force microscopy (C-AFM), nanomanufacturing, nanometrology, data storage and nanolithography.

* * * * *